United States Patent [19]
Renard et al.

[11] 3,923,318
[45] Dec. 2, 1975

[54] PORTABLE LUGGAGE OR LOAD CARRIER

[76] Inventors: Charles J. Renard, 356 Vincent Place; Louis L. Rifken, 344 Vincent Place, both of Elgin, Ill. 60120

[22] Filed: Dec. 3, 1973

[21] Appl. No.: 420,958

[52] U.S. Cl. .................................. 280/35; 280/79.1
[51] Int. Cl.² ........................................... B62B 3/04
[58] Field of Search .......... 280/35, 37, 47.13 R, 79.1

[56] References Cited
UNITED STATES PATENTS

| | | | |
|---|---|---|---|
| 189,531 | 4/1877 | Vorhees | 280/35 |
| 3,329,442 | 7/1967 | Vietri | 280/35 |
| 3,734,527 | 5/1973 | Bard | 280/79.1 |
| 3,735,996 | 5/1973 | Rath | 280/35 |

*Primary Examiner*—Leo Friaglia
*Assistant Examiner*—Michael J. Forman
*Attorney, Agent, or Firm*—Max R. Kraus

[57] ABSTRACT

A portable luggage or load carrier comprising, a pair of members or arms which are pivotally connected at their center and are so shaped that the members or arms are substantially parallel to each other when the carrier is collapsed and which forms a substantially X-configuration when in extended load carrying position, each of said members or arms having a roller or wheel secured to the outer end thereof whereby the same may be moved on a supporting surface, strapping members detachably connected to said arms or members to extend over the load to be carried to secure said carrier to said load whereby the load is supported on the carrier and moved with said carrier on a ground surface, said carrier being readily attached to and detached from the load to be carried and when detached may be collapsed to occupy a minimum of space.

4 Claims, 11 Drawing Figures

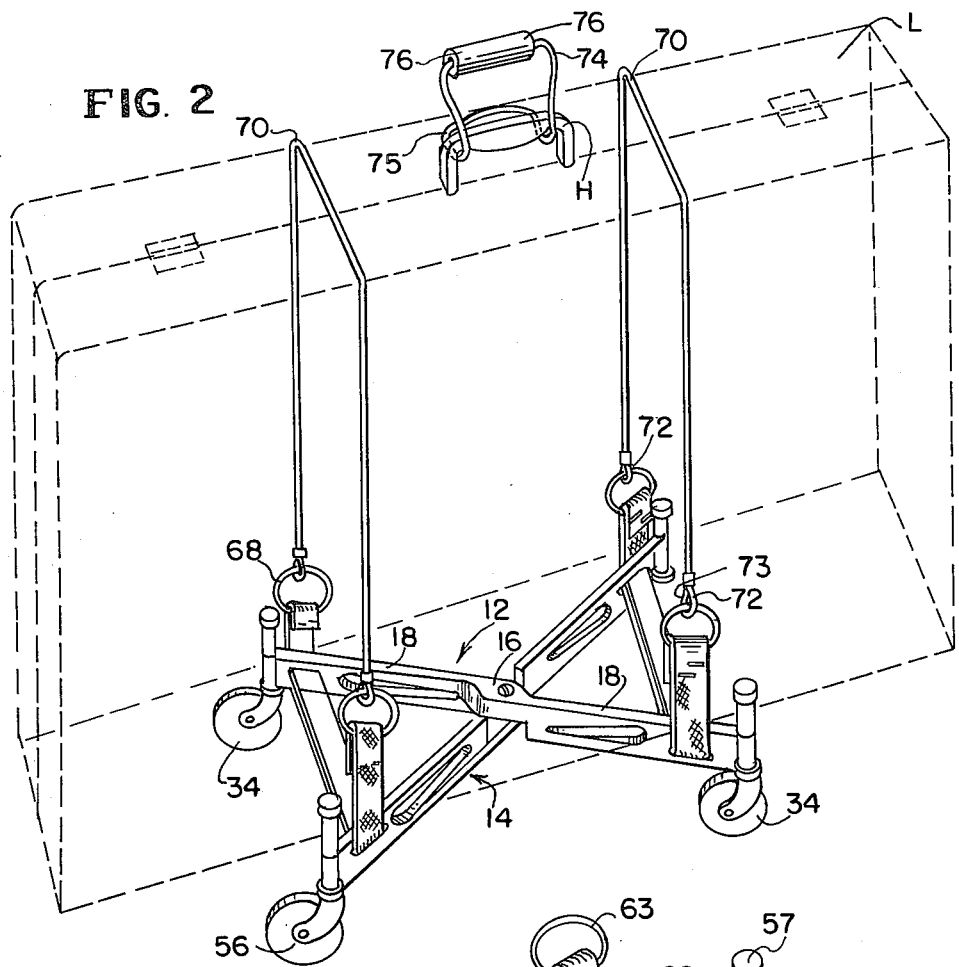
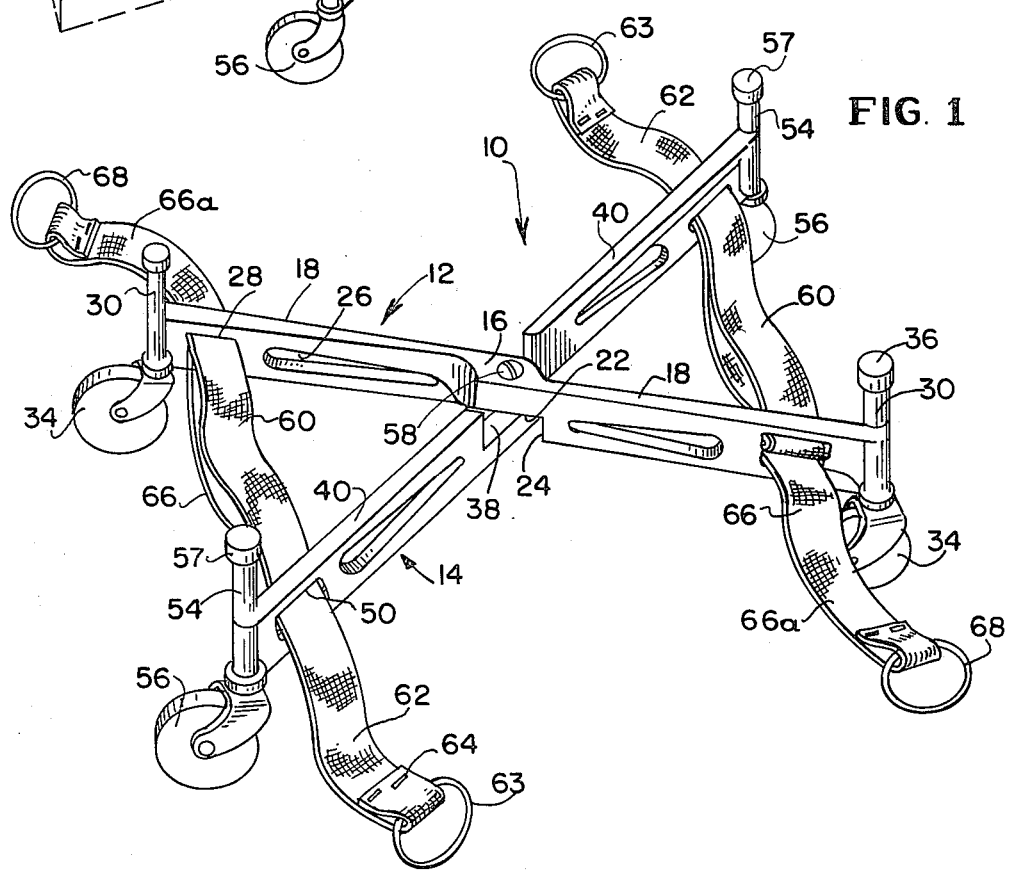

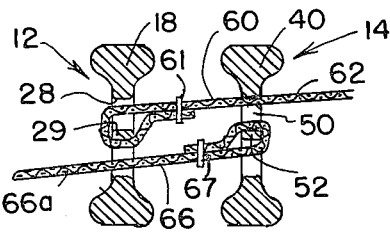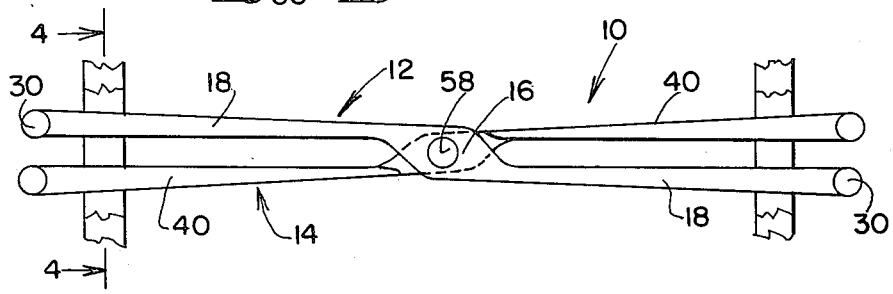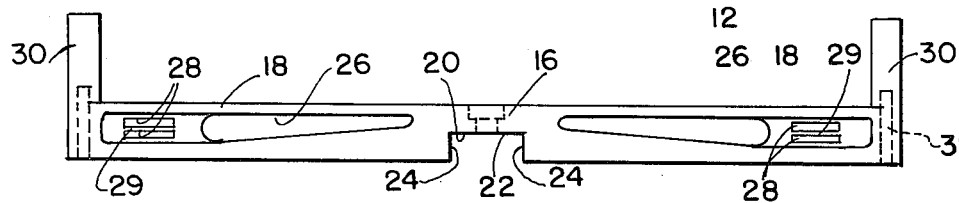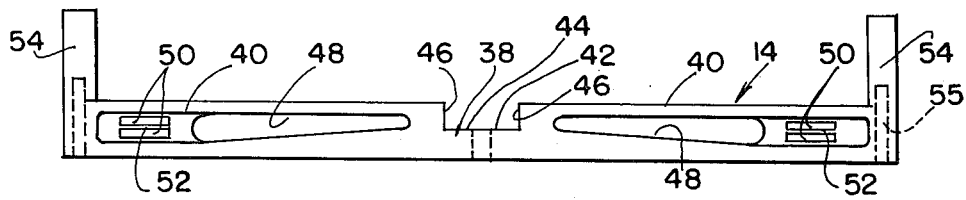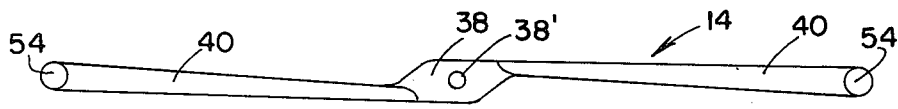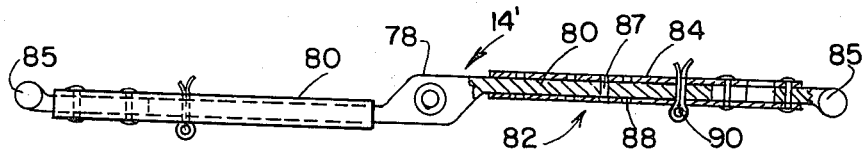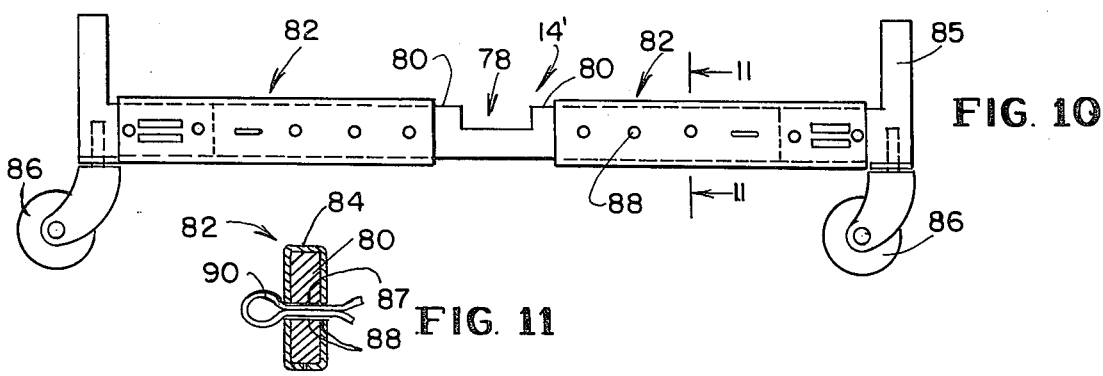

PORTABLE LUGGAGE OR LOAD CARRIER

BRIEF SUMMARY OF THE INVENTION

Travelers have frequently found it necessary to carry their own luggage and because of the size and weight it is unwieldy and can present a physical problem which results in strain or injury to the traveler. One of the objects of this invention therefore is to provide a very simple, portable and collapsible load carrying device which can be readily collapsed to occupy a minimum of storage space when not in use and may be readily extended to in-use position and readily secured to the underside of the load to be carried, such as luggage or the like, said device having wheels or rollers so that the carrier with the load or luggage supported thereon can be rolled on the ground or floor surface. The device is so constructed that it may be easily carried by the traveler to be used when desired.

Another object of this invention is to provide a load carrier having arms or members which are longitudinally adjustable to accommodate loads or luggage of varying widths and lengths.

Another object of this invention is to provide a carrier which is relatively light in weight, may be economically produced, and which is readily attachable to and detachable from the load to be carried.

Another object of this invention is to provide a load carrier having means for clamping the load to the carrier so that the load and the carrier may be moved as an integrated unit.

BRIEF DESCRIPTION OF THE DRAWINGS

In the drawings:

FIG. 1 is a perspective view of the invention with the arms in their extended or separated position, ready to receive a piece of luggage or the like.

FIG. 2 is a view similar to FIG. 1 and showing a piece of luggage in dotted lines supported thereon in load carrying position.

FIG. 3 is a top plan view of same in a collapsed position as for storage or the like.

FIG. 4 is an enlarged sectional view taken on line 4—4 of FIG. 3.

FIG. 5 is a side elevational view of one of the arms or members.

FIG. 6 is a top plan view of the arm of FIG. 5.

FIG. 7 is a side elevational view of the other arm.

FIG. 8 is a top elevational view of the arm of FIG. 7.

FIG. 9 is a top plan view, partly in section, of a modification showing an extensible arm.

FIG. 10 is a side elevational view of the arm of FIG. 9; and

FIG. 11 is an enlarged sectional view taken on line 11—11 of FIG. 10.

The preferred form of the invention is illustrated in FIGS. 1 through 8 inclusive.

The load carrier generally indicated at 10 comprises a pair of arms or members 12 and 14 and both of said arms or members are of generally similar shape and may be cast of aluminum or the like which provides strength and lightweight. The member or arm 12, best seen in FIGS. 1, 5 and 6, is formed with an enlarged central section or hub 16 and extending from said central hub section in opposite directions and integrally formed therewith are arm sections 18 which, as best seen in FIGS. 3 and 6, are generally parallel to each other but in an offset relationship. The top of the central hub section 16 is on the same plane as the top of the arm sections 18, whereas the bottom 20 of the central hub section is above the bottom plane of the arm sections to in effect provide a central recessed portion 22 between the spaced inner ends 24 of the arm sections 18. The sides of the arm sections 18 are provided with elongated slots 26 principally for reducing the weight of the arm. Adjacent the outer end of each of said arm sections 18 is a slotted portion 28 with an intermediate cross-bar 29 extending across the slot 28, best seen in FIGS. 4 and 5, which serves to permit the strap or connectors to be anchored thereto, as will be subsequently described.

Formed integrally at each of the opposite ends of said arm 12 is an upright end 30 which extends above the top of said arm. The lower portion of the upright is hollow as at 32 to receive the conventional collar into which is inserted the conventional stem of a conventional roller or swivel caster generally indicated at 34 and said wheel or roller swivels or rotates in said upright 30 but is securely fastened thereto, as is well understood. A rubber or plastic cap 36 is secured to the top of said uprights to serve as a cushion when the upright is positioned against the sides of the luggage.

The other arm 14, best seen in FIGS. 1, 7 and 8, is generally similar in structure to arm 12 and comprises an enlarged central hub portion 38 with diametrically opposite extending arm sections 40 integrally formed therewith, with said arm sections being generally parallel but offset with respect to each other, similar to the manner of arm member 12. The bottom portion of the central hub 38 is on the same plane as the bottom of the arm sections 40, whereas the top 42 of said central hub is spaced below the top of the arm sections 40 to provide a recess 44 between the spaced inner ends 46 of the arm sections 40. The arm 14 is likewise formed to provide elongated slots 48 and 50 adjacent the outer ends thereof, each of said outer ended slots having a central cross-bar 52 integrally formed to which the straps or connectors to be described are secured.

Formed integrally at each of the opposite ends of arm 14 is an upright end 54, similar to the upright ends 30, with the lower end thereof being hollow as at 55, similar to the hollow portion 32 previously described, to each receive a collar, stem, and a conventional swivel or rotatable roller 56 so that the rollers 56 rotate or swivel, similar to the rollers 34 previously described. The top of each of said upright ends is capped with a rubber or plastic cap 57, similar to cap 36. The central hubs 16 and 38 of the respective arms are each provided with a central opening 16' and 38' respectively and a fastening bolt 58 passes therethrough and is secured by a conventional nut to pivotally secure the two arms or members 12 and 14 with respect to each other for pivotal movement. The recessed portions 22 and 44 of the two arms are contiguous to each other.

By virtue of the offset arm sections of each of said arms relative to their respective hubs, the arms 12 and 14 may be positioned in a collapsed position, that is, pivoted close to each other to assume the position shown in FIG. 3, with the two arms extending substantially parallel to and closely adjacent each other so that the entire unit when collapsed occupies very little space and may be portably carried or placed in a bag or inside a luggage case. When the arms 12 and 14 are in extended position, as shown in FIGS. 1 and 2, for use as a luggage or load carrying device, the arms are pivoted to a spread-apart position to form substantially an X- configuration of any desired width, determined by the straps or connectors to be presently described.

The straps or connectors are arranged in pairs at each of the opposite ends of the arms so that one strap is anchored to one arm with the opposite end of the strap passing through the other arm. The other of said pair of straps is anchored to the opposite arm and passes through said arm, the same arrangement also being at the opposite end of the arms so that as each pair of straps or connectors are pulled or urged outwardly away from each other the arms 12 and 14 will pivot toward each other. For example, as shown in FIG. 4, anchored to arm 12 is flexible strap or connector 60, to the end of which is looped around the cross bar 29 and fastened as at 61, with the opposite or free end 62 of connector 60 passing through the top of slot 50, to which free end is secured a metal ring 63 as by looping the end of the strap and stapling or fastening the end as at 64, best seen in FIG. 1.

A second strap or connector 66, best seen in FIG. 4, is positioned below strap 60 and is similarly anchored as at 67 to the cross-bar 52 of arm 14, with the free end 66a of strap 66 passing through the slot 28 of arm 12 and being secured to a metal ring 68. The same arrangement of straps or connectors is duplicated at the opposite end, with the strap 60 anchored to arm 12 and freely passing through arm 14. The second strap 66 is anchored to arm 14 and freely passes through arm 12. When the device is carrying a load, the opposite ends of the straps or connectors 60 and 66 are pulled outwardly with respect to each other at each end, as shown in FIG. 2, which causes the arms 12 and 14 to be urged to pivot toward each other so that the uprights 30 and 54 at each end of the arms will abut against the side of the luggage L and tend to clamp the load carrying device 10 against the luggage in load carrying position.

To secure the luggage L to the carrier, best seen in FIG. 2, there is provided a pair of strong elastic cord-like members 70, to the opposite ends of which are secured conventional hooks 72, the open ends of the hooks being closed by conventional leaf springs 73 to permit the hooks to be readily attached to the rings and to permit detachment therefrom. With the elastic cord members 70 wrapped around the luggage L (FIG. 2) and the hooks 72 engaging the rings, the free ends of the straps or connectors 60 and 66 are pulled in opposite directions which in turn pivots the arms 12 and 14 towards each other to clamp the luggage therebetween and hold the carrier fast to the underside of the luggage or load. When thus connected the luggage or load may be moved around on a floor or ground surface without lifting, or in such condition may be placed inside the trunk of an automobile or inside the automobile proper and so transported to an airplane, train, bus or the like. If it is desired to remove the carrier 10 from the luggage or load this can be readily accomplished by unstrapping the elastic members 70. It will be seen that the width of the X-configuration can be adjusted and varied to accommodate luggage, boxes, containers or other loads from a minimum width to a relatively large width. When the carrier is detached from the luggage or load it can be collapsed to the position shown in FIG. 3 and placed into a relatively small container to be carried.

FIG. 2 shows an auxiliary detachable handle 74 which may be used in connection with the carrier to eliminate the necessity of stooping while moving the carrier and luggage along the ground surface. The auxiliary handle is formed of substantially rigid wire material having a generally U-shaped configuration with the free end turned upwardly to form a hook 75 to engage the handle H of the luggage, with the opposite end of said wire member supporting a roller 76 which may be manually engaged. The auxiliary handle is readily attached to the handle of a piece of luggage and extends thereabove so that it may be grasped, thus, a person may move the carrier and luggage attached thereto along the ground or floor surface without stooping or bending.

FIGS. 9, 10 and 11 show a modification in which the arms 12' and 14' are each adjustable in length. Only one of the arms 14' is shown in said FIGS., it being understood that the other arm 12' is similarly constructed in the extensible feature. Arm 14' has a central hub section 78 with oppositely extending arm sections 80 offset with respect to each other, similar to that previously described. Telescopically secured to each arm section 80 is an extensible arm section generally indicated at 82 which has a sleeve portion 84 in telescopic arrangement with arm section 80 and slidable relative thereto. The sleeve portion carries the upright 85 fixedly secured thereto at the outer end, similar to upright 57, and also supports the rollers 86. The arm section 80 has spaced openings 87 which are alined with spaced openings 88 in the sleeve portion, with a cotter pin 90 or the like passing therethrough to hold same in any adjusted position. Connecting straps, not shown, similar to straps 60 and 66 are similarly secured to the adjustable arm sections in the manner previously described.

By extending the length of the arms 12' and 14' the length of the carrier is increased and the width between the ends of the arms may be increased to accommodate luggage or boxes or containers of varying widths.

While the invention is shown in FIG. 2 as carrying a single piece of luggage it is not so limited in usage as other luggage can be positioned on each side with the bottoms of same resting on top of the uprights and with the elastic cords encompassing all and holding same together in load carrying position.

What is claimed is:

1. A portable luggage or load carrier comprising, a pair of arms, namely, a first arm and a second arm both of similar shape, each said arm having a central portion and oppositely extending sections, with one of said sections parallel to but offset from the other section, said pair of arms pivotally connected together at their respective central portions so that the arms may be positioned substantially parallel to each other when collapsed and positioned to form a substantially X-configuration when in load carrying position, wheel means secured adjacent the outer end of each of said arms whereby the carrier may be rolled or wheeled on a floor or ground surface, an opening in each of said arms adjacent the outer ends thereof, a pair of straps at each of the opposite ends of said arms, one of each pair of straps anchored to said first arm and passing through the opening in the second arm and the other of said pair of straps anchored to said second arm and passing through the opening in said first arm so that when the ends of the opposite straps are pulled outwardly away from each other the pair of arms will pivot toward each other, and means associated with each pair of straps and extending over the luggage or load supported on said carrier to secure said luggage or load on said carrier whereby the luggage or load may be moved with the movement of said carrier.

2. A carrier as set forth in claim 1 in which the arms have upwardly extending ends which are adapted to engage the sides of the load and in which the means connected to each pair of straps is elastic and when around the load urges the arms in a direction towards each other so that the upwardly extending ends clamp against the sides of the load to firmly secure the load to the carrier.

3. A carrier as set forth in claim 1 in which each of the arms or members is longitudinally adjustable to extend the length of each of said arms or members.

4. A carrier as set forth in claim 3 in which the arms or members each has a central hub portion where the arms or members are pivotally connected to each other and where each of said arms includes a fixed arm section and an extensible arm section coupled to said fixed arm section to permit elongation of each arm in any desired position and in which the extensible arm section supports an upwardly extending end which is adapted to engage the sides of the load or luggage supported on said carrier.

* * * * *